Patented Sept. 5, 1950

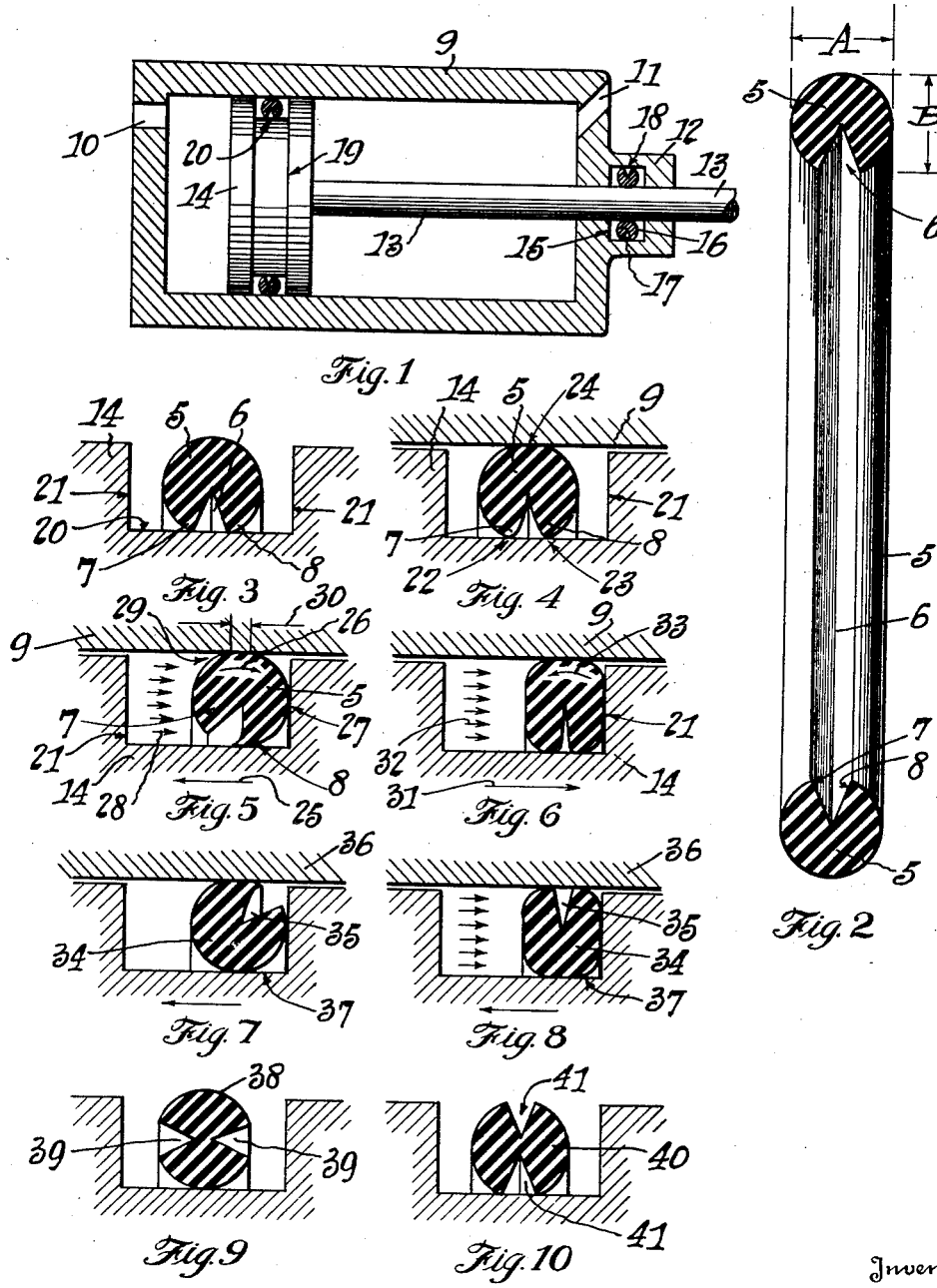

2,521,248

UNITED STATES PATENT OFFICE 2,521,248

PACKING MEANS

Arthur L. Parker, Cleveland, Ohio, assignor to The Parker Appliance Company, Cleveland, Ohio, a corporation of Ohio Application December 13, 1944, Serial No. 567,953

7 Claims. (Cl. 286—26)

The invention relates generally to packing and primarily seeks to provide certain new and useful improvements in packing rings suitable for use in cylinder and piston or comparable assemblies.

In assemblies of the character stated, the cylinder and piston or comparable elements move relatively, and either the stationary elements or the movable elements are equipped with annular grooves in which sealing rings of yieldable material are mounted, said rings being deformed or compressed slightly in the radial direction so as to engage in sealing contact at the inner and outer surfaces thereof with the relatively movable elements, and said grooves being only slightly wider than the axial dimension of the compressed rings so as to provide limited freedom of the rings in said grooves. In some installations of the character stated, the rings are subjected to high temperatures and to possible contact by oil or gasoline, and it is an object of the present invention to provide a novel sealing ring structure that will function efficiently under such conditions as well as under more favorable conditions of use. Among the purposes of the present invention is that of shaping the ring cross section in a novel manner providing a clearance effective to accommodate any swelling of the ring due to high temperatures or contacts with oil or gasoline, and also to provide a greater dimension of the ring radially than axially so that slight rolling movement in either direction will increase the sealing contact of the ring against the sealed surfaces.

An object of the invention is to provide a sealing ring of the character stated in which the circular cross section of the ring is interrupted by a continuous generally V-shaped groove or clearance extending throughout the full circle of the ring.

Another object of the invention is to provide a sealing ring of the character stated in which the V-shaped groove is disposed in the central plane of the ring.

Another object of the invention is to provide a sealing ring of the character stated in which two V-shaped grooves are provided about the whole circle of the ring in diametrically opposed relation.

With the above and other objects in view that will hereinafter appear, the nature of the invention will be more clearly understood by reference to the following detailed description, the appended claims, and the several views illustrated in the accompanying drawings.

In the drawings:

Figure 1 is a somewhat diagrammatic cross sectional illustration of a cylinder and piston assembly as a pump or motor and having the invention embodied therein, in one form as a piston groove mounted piston packing, and in another form as a cylinder groove mounted rod packing.

Figure 2 is an enlarged detail cross sectional view illustrating a packing ring embodying the invention.

Figure 3 is a fragmentary sectional view illustrating the packing ring of Figure 2 mounted in a receiving groove in a piston or cylinder element.

Figure 4 is a view similar to Figure 3 illustrating the packing ring of Figure 2 mounted in sealing contact between the base of a mounting groove in a piston and the opposing cylinder wall.

Figure 5 is a view similar to Figure 4 illustrating the limited rolling of the ring upon initiation of a movement of the piston to the left, the application of fluid pressure against the ring as during use of the piston and cylinder assembly as a pump also being indicated.

Figure 6 is a view similar to Figure 5 illustrating the ring as deformed against a mounting groove wall as by fluid pressure during use of the piston and cylinder assembly as a motor.

Figures 7 and 8 are fragmentary sectional views similar to Figures 5 and 6 respectively illustrating a modified form of the ring in which the groove or clearance is formed in the outer wall of the ring instead of in the inner wall as in said Figures 5 and 6.

Figure 9 is a view similar to Figure 3 illustrating a modified form of the ring in which two diametrically oppositely disposed grooves are formed in the side walls of the ring.

Figure 10 is a view similar to Figure 3 illustrating a modified form of the ring in which two diametrically oppositely disposed grooves are formed in the inner and outer walls of the ring in the central plane thereof.

It is to be understood that the packing or sealing ring comprising the subject matter of the present invention is subject to many and varied uses, and in this disclosure only two of these uses are illustrated, these being somewhat diagrammatically illustrated in Figure 1.

The improved packing or sealing ring structure is illustrated in detail in Figure 2 and comprises a circular ring 5 of rubber or equivalent yieldable material. The ring is generally circular in cross section and is equipped with a V-shaped groove or clearance 6 extending about the whole circle of the ring at the inside thereof and in the central plane of the ring. The groove 6 provides a clearance effective to take up any swelling of the ring due to high temperatures or contacts with oil or gasoline without materially increasing the cross section of the ring. It will also be apparent by reference to Figure 2 that by reason of the provision of the groove 6 the dimension A of the ring cross section is greater than the dimension B, and two flexible lips 7 and 8 are provided at opposite sides of the groove. The purpose and advantage of these structural features will become apparent as this description progresses.

In Figure 1 of the drawing a piston and cylinder assembly is somewhat diagrammatically illustrated. The cylinder 9 has end ports 10 and 11 and a bearing 12 for the piston rod 13 attached to the piston 14 which is reciprocably mounted within the cylinder. The bearing 12 is equipped with a groove 15 surrounding the reciprocable rod 13, and a sealing ring 16 is mounted in the groove and equipped with a continuous V-shaped groove 17 at its outer side in position for having the flexible lips thereof engage in sealing contact with the base 18 of the groove. The inner side of this ring engages in sealing contact with the reciprocating rod 13. It will also be apparent that the side walls of the groove 15 are spaced apart a distance only a fraction greater than the cross section or axial dimension of the ring. This constitutes one use of the improved ring structure.

In the same Figure 1 there is illustrated another use of the improved ring structure, this time constructed as shown in Figure 2. The piston is provided with a groove 19 in which is mounted the sealing ring 6 disposed with its flexible lips 7 and 8 engaging in sealing contact with the base 20 of the groove and with its outer side in sealing contact with the cylinder wall.

It is to be understood that the structure diagrammatically shown is illustrative of a piston and cylinder assembly operable as a pump, in which case the piston will be power driven and will force fluid before it in one or the other or both of its travel movements, or as a motor, in which case the piston will be caused to reciprocate by application of fluid pressure alternately to the opposite faces thereof.

The enlarged fragmentary sectional view, Figure 3, clearly illustrates that the groove in which the ring is mounted has its side walls 21 spaced apart a distance only a fraction greater than the cross section or axial dimension of the ring 5. The normal position of the ring in its mounting groove is illustrated in Figure 3. The diameter of the base 20 of the groove is preferably made slightly greater than the inside diameter of the ring, and likewise, when the ring is properly placed in the groove, the outer diameter thereof is slightly greater than the diameter of the cylinder wall with which the piston and ring cooperate. Thus, as shown in Figure 4, the ring is squeezed or deformed at the points indicated by the arrows 22, 23 and 24 on this figure in order to establish the desired fluid tight seal between the piston 14 and the cylinder 9.

When the piston moves toward the left, as indicated by the arrow 25 in Figure 5, the ring 5 rolls slightly to the right as indicated by the arrow 26 until contact with the groove wall at 27 serves to limit the amount of rolling of the ring prior to sliding thereof along the cylinder wall, and thus all objectionable turning or twisting of the ring is prevented. When the reverse movement of the piston is initiated, this action will be repeated in the reverse direction.

Because the cross section of the ring at A is greater than the cross section at B, as previously described, the contact pressure between the cylinder and ring and the piston and ring is greater in the Figure 5 position of the ring than in the Figure 4 position. Thus, a tighter seal is provided while the piston is moving in one direction or the other than when the ring is centered as shown in Figure 4. Obviously, this is a desirable condition, and the construction and arrangement of parts bringing this condition about constitutes a feature of the invention.

Assuming the piston to be acting as a pump, when pressure acts on the ring as indicated by the arrows 28 during movement of the piston, or after such movement has stopped, the ring will be against the groove side as at 27 in Figure 5. In this position the pressure acts against the lip 8 as indicated to establish a lip seal against the base or bottom wall of the piston grooves. Also, since the ring is sealed at 29, there will be a pressure seating effect on the area indicated by the opposed arrows 30, whereupon any upward movement of the lip 7 will not affect the pressure seating of the lip 8.

When the piston is operating as a motor and moving to the right as indicated by the arrow 31, the pressure acting as indicated by the arrows 32 forces the ring to the right as shown in Figure 6 and the movement of the piston tends to turn the ring counterclockwise as indicated by the arrow 33 or shift said ring away from the piston groove side wall 21. In this instance there is a pressure seating effect on the whole ring and the high pressure will squeeze the ring as shown.

In Figures 7 and 8 there is illustrated a modified form of ring designated 34 having its groove or clearance 35 formed in the outer side of the ring so as to oppose the cylinder wall or rod 36 instead of the mounting groove base 37 as in the forms illustrated in Figures 2 through 6. Except for the differences in the surfaces engaged by the respective grooved and non-grooved inner and outer portions of the ring the sealing and pressure effects will be the same in the arrangements shown in Figures 7 and 8 as those described in connection with Figures 5 and 6.

In Figure 9 of the drawing there is illustrated another modified form of sealing ring designated 38, and this ring has two diametrically oppositely disposed clearances or grooves 39 arranged in the sides of the ring.

In Figure 10 of the drawing there is illustrated still another modified form of sealing ring designated 40. This ring is equipped with two diametrically oppositely disposed clearances or grooves 41 arranged in the central plane of the ring, or in other words, in the inner and outer surfaces thereof.

While several forms of the improved packing or sealing ring structure are shown and described herein, it is to be understood that other variations in the form of the ring are comprehended within the scope of the invention as defined in the appended claims.

I claim:

1. The combination with a pair of relatively reciprocable elements, of a packing ring of deformable resilient material mounted between said elements with inner and outer portions thereof in rolling sealing contact with said elements, said ring being round in cross section except for a groove extending thereabout and providing a clearance effective to take up any swelling of the ring due to high temperatures or contacts with oil or gasolene without materially increasing the cross section of the ring.

2. The combination with a pair of relatively reciprocable elements one of which has a packing groove therein, of a packing ring generally circular in cross section and formed of deformable resilient material mounted in said groove with inner and outer portions thereof in rolling sealing contact with the base of the groove in one element and the wall portion of the other element opposite said groove, said ring having a groove extending thereabout providing a clearance effective to take up any swelling of the ring due to high temperatures or contacts with oil or gasolene without materially increasing the cross section of the ring, and said element groove having a width only slightly greater than the cross section of the ring so as to permit only a limited amount of rolling movement of the ring as relative reciprocation of the elements is initiated in each direction.

3. The combination with a pair of relatively reciprocable elements, of a packing ring of deformable resilient material mounted between said elements with inner and outer portions thereof in rolling sealing contact with said elements, said ring being round in cross section except for a groove extending thereabout and providing a clearance effective to take up any swelling of the ring due to high temperatures or contacts with oil or gasolene without materially increasing the cross section of the ring, and said ring groove being disposed in the central plane of the ring and effective to provide a greater ring cross sectional dimension in the axial direction of the ring than in the radial direction thereof whereby upon each initiation of direction change of the relative movement between the elements slight rolling of the ring against the sealed surfaces of said elements will take place and sealing pressure against said sealed surfaces will be accentuated.

4. The combination with a pair of relatively reciprocable elements one of which has a packing groove therein, and a packing ring generally circular in cross section and formed of deformable resilient material mounted in said groove with inner and outer portions thereof in rolling sealing contact with the base of the groove in one element and the wall portion of the other element opposite said groove, said ring having a groove extending thereabout providing a clearance effective to take up any swelling of the ring due to high temperatures or contacts with oil or gasolene without materially increasing the cross section of the ring, and said element groove having a width only slightly greater than the cross section of the ring so as to permit only a limited amount of rolling movement of the ring as relative reciprocation of the elements is initiated in each direction, and said ring groove being disposed in the central plane of the ring and effective to provide a greater ring cross sectional dimension in the axial direction of the ring than in the radial direction thereof whereby upon each initiation of direction change of the relative movement between the elements slight rolling of the ring against the sealed surfaces of said elements will take place and sealing pressure against said sealed surfaces will be accentuated.

5. The combination with a pair of relatively reciprocable elements one of which has a packing groove therein, and a packing ring generally circular in cross section and formed of deformable resilient material mounted in said groove and of such cross sectional dimension that the inner and outer portions thereof engage in rolling sealing contact simultaneously with the base of the groove in one element and the wall portion of the other element opposite said groove, said ring having a groove extending thereabout providing a clearance effective to take up any swelling of the ring due to high temperatures or contacts with oil or gasolene without materially increasing the cross section of the ring, and said element groove having a width only slightly greater than the cross section of the ring so as to permit only a limited amount of rolling movement of the ring as relative reciprocation of the elements is initiated in each direction, and said ring groove being disposed in the central plane of the ring and in opposition to and opening against the base of the element groove and effective to provide a greater ring cross sectional dimension in the axial direction of the ring than in the radial direction thereof whereby upon each initiation of direction change of the relative movement between the elements slight rolling of the ring against the sealed surfaces of said elements will take place and sealing pressure against said sealed surfaces will be accentuated.

6. The combination with a pair of relatively reciprocable elements one of which has a packing groove therein, and a packing ring generally circular in cross section and formed of deformable resilient material mounted in said groove with inner and outer portions thereof in rolling sealing contact with the base of the groove in one element and the wall portion of the other element opposite said groove, said ring having a groove extending thereabout providing a clearance effective to take up any swelling of the ring due to high temperatures or contacts with oil or gasolene without materially increasing the cross section of the ring, and said element groove having a width only slightly greater than the cross section of the ring so as to permit only a limited amount of rolling movement of the ring as relative reciprocation of the elements is initiated in each direction, and said ring groove being disposed in the central plane of the ring and V-shaped so as to provide two flexible lips opposing the base of the element groove and effective to provide a greater ring cross sectional dimension in the axial direction of the ring than in the radial direction thereof whereby upon each initiation of direction change of the relative movement between the elements slight rolling of the ring against the sealed surfaces of said elements will take place and sealing pressure against said sealed surfaces will be accentuated.

7. A packing ring of deformable resilient material the body of which has a circular radial cross section and a smooth readily rollable exterior except for the interruption of said smooth exterior by an annular grooving extending about the whole circle of the ring in the central plane only of the ring when the ring is in repose, said grooving being of such width as to provide a substantially lesser cross sectional dimension of the ring body radially of the ring than in any other direction across said body through the center thereof.

ARTHUR L. PARKER.

REFERENCES CITED

The following references are of record in the file of this patent:

UNITED STATES PATENTS

| Number | Name | Date |
|---|---|---|
| 1,811,649 | Russell | June 23, 1931 |
| 2,115,383 | Christensen | Apr. 26, 1938 |
| 2,208,620 | Baisch | July 23, 1940 |
| 2,247,609 | Devilbiss | July 1, 1941 |
| 2,314,386 | Brend | Mar. 23, 1943 |

FOREIGN PATENTS

| Number | Country | Date |
|---|---|---|
| 173,852 | Germany | of 1906 |